United States Patent
Heidemeyer et al.

(10) Patent No.: US 10,076,955 B2
(45) Date of Patent: *Sep. 18, 2018

(54) CONTAINER OF THERMOPLASTIC MATERIAL

(71) Applicant: Kautex Textron GmbH & Co. KG, Bonn (DE)

(72) Inventors: Timm Heidemeyer, Cologne (DE); Ulrich Karsch, Niederkassel (DE); Stefan Lenz, Bergisch Gladbach (DE); Frank Quant, Bonn (DE); Thomas Wagner, Kerpen (DE)

(73) Assignee: KAUTEX TEXTRON GMBH & CO. KG, Bonn (DE)

( * ) Notice: Subject to any disclaimer, the term of this patent is extended or adjusted under 35 U.S.C. 154(b) by 0 days.

This patent is subject to a terminal disclaimer.

(21) Appl. No.: 15/483,166

(22) Filed: Apr. 10, 2017

(65) Prior Publication Data

US 2017/0217306 A1    Aug. 3, 2017

Related U.S. Application Data

(63) Continuation of application No. 14/433,214, filed as application No. PCT/EP2013/068675 on Sep. 10, 2013, now Pat. No. 9,617,034.

(30) Foreign Application Priority Data

Oct. 2, 2012   (DE) .................. 10 2012 019 334

(51) Int. Cl.
*B60P 3/22*     (2006.01)
*B60K 15/03*    (2006.01)
(Continued)

(52) U.S. Cl.
CPC ........ *B60K 15/03177* (2013.01); *B29C 49/04* (2013.01); *B29C 49/20* (2013.01);
(Continued)

(58) Field of Classification Search
CPC .................................. B65D 7/48; B65D 7/42
(Continued)

(56) References Cited

U.S. PATENT DOCUMENTS

| 4,736,083 | A | 4/1988 | Saville |
| 4,855,989 | A | 8/1989 | Gyger, Jr. |

(Continued)

FOREIGN PATENT DOCUMENTS

| DE | 19749950 A1 | 5/1999 |
| EP | 2465662 A2 | 6/2012 |

(Continued)

OTHER PUBLICATIONS

English language PCT International Search Report dated Nov. 25, 2013, received in corresponding PCT Application No. PCT/EP13/68675, 3 pgs.

(Continued)

*Primary Examiner* — King M Chu
(74) *Attorney, Agent, or Firm* — Grossman, Tucker, Perreault & Pfleger, PLLC (57) ABSTRACT

The invention relates to a container (1) of thermoplastic material with at least one support (4), which is arranged in the interior of the container, extends between opposing container walls (2) and is anchored at each end to the container walls with a positive engagement and/or a material bond, the support (4) comprising at least one supporting strut (5) and the supporting strut (5) substantially absorbing a supporting load on the container walls (2) induced by negative pressure in the container, and a tensile force that is induced by positive pressure being absorbed by at least one (Continued)

tension-resistant bracing element in the form of a tension-resistant band (8) which extends between the container walls (2).

18 Claims, 6 Drawing Sheets

(51) Int. Cl.
  *B65D 6/34* (2006.01)
  *B29C 49/04* (2006.01)
  *B29C 49/20* (2006.01)
  *B29L 31/00* (2006.01)
  *B29K 23/00* (2006.01)

(52) U.S. Cl.
  CPC ...... *B65D 11/22* (2013.01); *B29C 2049/2013* (2013.01); *B29K 2023/065* (2013.01); *B29L 2031/7172* (2013.01); *B60K 2015/03032* (2013.01)

(58) Field of Classification Search
  USPC ........ 220/562, 651, 652, 653, 654, 645, 639
  See application file for complete search history.

(56) References Cited

U.S. PATENT DOCUMENTS

| | | |
|---|---|---|
| 5,607,075 A | 3/1997 | Burgdorf et al. |
| 2009/0206097 A1 | 8/2009 | Gebert et al. |
| 2011/0168728 A1 | 7/2011 | McDermott et al. |
| 2012/0024038 A1 | 2/2012 | Von Tardy-Tuch et al. |
| 2012/0024868 A1 | 2/2012 | Menke |
| 2012/0037638 A1 | 2/2012 | Criel et al. |
| 2012/0138606 A1 | 6/2012 | Varga |
| 2014/0014663 A1 | 1/2014 | Eulitz et al. |

FOREIGN PATENT DOCUMENTS

| | | |
|---|---|---|
| FR | 2481773 A | 11/1981 |
| FR | 2764671 A1 | 12/1998 |
| FR | 2799526 A1 | 4/2001 |
| JP | 2010076526 A | 4/2010 |
| JP | 2011005950 A | 1/2011 |

OTHER PUBLICATIONS

English language PCT Written Opinion dated Nov. 25, 2013, received in corresponding PCT Application No. PCT/EP13/68675, 5 pgs.

CONTAINER OF THERMOPLASTIC MATERIAL

The invention relates to a container of thermoplastic material with at least one support, which is arranged in the interior of the container, extends between opposing walls of the container and is anchored at each end to the walls of the container with a positive engagement and/or a material bond, the support comprising at least one supporting strut.

Such a container is known for example from DE 10 2010 036 683 A1. DE 10 2010 036 683 A1 relates to a fuel tank with a cavity, arranged in which is a reinforcing device serving for support, the reinforcing device being configured such that it can absorb both compressive forces and tensile forces. Provided for this purpose is a tension-compression strut, which is arranged between two opposing wall regions of the fuel tank and respectively passes through the walls of the fuel tank. The tension-compression strut is braced between the two opposing wall members of the fuel tank by means of a spring device; the opposing wall members of the fuel tank are prestressed in the outward direction by means of the spring element. This spring element is configured as a helical compression spring and is braced between the two wall regions such that the two wall regions do not move toward one another when a negative pressure occurs in the cavity of the fuel tank, but the ability of the plastic container to undergo deformation in the event of exposure to external accident-induced forces remains substantially unaffected. In this case, the deformation forces are absorbed by the spring element. When a positive pressure occurs in the container, the deformation forces are absorbed by the tension-compression strut.

The arrangement according to DE 10 2010 036 683 A1 has the advantage that the distance between the container walls remains substantially constant both when a negative pressure occurs in the container and when a positive pressure occurs in the container.

However, the structure has the disadvantage that the tension-compression strut passes through the container wall. In the region of the openings in the container wall produced as a result, additional sealing of the container wall is required. In particular in the case of fuel tanks of thermoplastic material with barrier layers for hydrocarbons, such a breach of the container wall is not desirable. Any breach of the container wall forms a potential leakage path for volatile hydrocarbons.

In addition, the design according to DE 10 2010 036 683 A1 is relatively complex and heavy because of the spring element that is used and the other metal parts that are used. In addition, metal parts installed in plastic containers must under certain circumstances be grounded. Finally, it is only by providing a relatively small deformation displacement of the container walls that there is no impairment in the event of a crash. If greater deformations occur, the tension-compression strut breaks through the sealing elements provided on the outer skin of the container.

As an alternative to the variants described in DE 10 2010 036 683 A1, more simple variants of the support of the container wall with columnar reinforcing elements inside the container are known, but these elements all have the disadvantage that, because of their stiffness, when there are accident-induced deformations of the container wall they break through the container wall or bring about a tearing open of the container wall, so that fuel can run out.

In particular for fuel tanks in hybrid vehicles, it is desirable for the containers to be stabilized in such a way that they can withstand an increased positive pressure, at least for a short time. In the case of such containers, it is desirable to stabilize them such that, in a static loading case, they remain substantially dimensionally stable up to a positive pressure of at least 450 mbar with respect to atmospheric pressure. Known external reinforcing measures for containers are complex and are at the expense of the weight of the container. Known internal reinforcing measures are to some extent at the expense of the volume of the container and at the expense of the leak-tightness of the container in the event of a crash.

The invention is therefore based on the object of improving a container of the type mentioned at the beginning with regard to the disadvantages described above.

The object is achieved by a container of thermoplastic material with at least one support, which is arranged in the interior of the container, extends between opposing walls of the container and is anchored at each end to the walls of the container with a positive engagement and/or a material bond, the support comprising at least one supporting strut and the container being distinguished by the fact that the supporting strut substantially absorbs a supporting load on the container walls induced by negative pressure in the container, and a tensile force that is induced by positive pressure is absorbed by at least one tension-resistant bracing element which extends between the container walls.

The underlying concept of the invention is that, whenever different structural elements are provided for the transmission of compressive forces and tensile forces, it is possible in principle to realize a support which has a higher tensile strength than compressive strength, so that for example the supporting strut and/or parts of the support can fail in the event of a crash, thereby preventing them from running through the container walls. In addition, a negative pressure possibly occurring in the container is generally less than a positive pressure intended by design to occur in the container. The supporting strut provided according to the invention only has to be able to absorb mounting forces that possibly occur during the installation of the support and also the compressive forces that occur when there is a vacuum in the container. Under some circumstances, a negative pressure of up to 50 mbar with respect to atmospheric pressure may occur in the container; the resultant supporting forces are preferably absorbed by the support.

A supporting rod or a supporting tube may be provided for example as the supporting strut.

In the case of a particularly preferred variant of the container according to the invention, it is provided that the supporting strut is provided at each end with a base, which is connected to the container wall. This base may be formed for example as a plastic base which has been welded or riveted to the container wall during the production of the container.

The two bases, which between them can receive the supporting strut, may be connected to one another for example by means of a tension-resistant band as a bracing element.

The use of one or more tension-resistant bands as bracing elements has the advantage that such bands take up a minimal internal volume of the container and that they have a negligible weight or negligible mass.

In the case of a particularly expedient variant of the container according to the invention, it is provided that the bases are prestressed against the supporting struts by the at least one tension-resistant band. This makes it possible in particular to mount the support such that collapsing of the band is in any event prevented. Collapsing of the band in the final installed position of the support should also be prevented. Alternatively, the supporting strut may be provided with at least one predetermined breaking point, which brings about immediate failure of the supporting strut in the event of a crash. The supporting strut may alternatively also allow itself to be telescoped against the resistance of detent elements.

Also possible in principle are collision-induced deformation forces which have the effect of driving the container walls apart, to be precise by an increase in pressure suddenly occurring within the container. In this case, it is expedient that the band and/or at least one base is provided with at least one predetermined breaking point, which makes it possible for the band to be detached from the base if a predetermined tensile force is exceeded.

In the case of a particularly advantageous variant of the container according to the invention, the supporting strut is engaged compliantly in the longitudinal direction in at least one base. Engaged compliantly in the longitudinal direction means that, for example in the event of a crash, a relative movement between the base and the support is possible under exposure to force from the outside.

Although reference is made above to a supporting strut, the invention should be understood as meaning that a number of supporting struts may extend between two bases or plates. The container may also have correspondingly formed supports at various points.

The regions of large area of opposing container walls are preferably supported against one another, i.e. those areas of the container walls that have the smallest geometrical moment of inertia or for which it can be expected that, in a given loading case, they could undergo the greatest deformation or could complete the greatest deformation displacement.

At least one band of fiber-reinforced plastic or glass fiber, aramid fiber or carbon fiber may be provided as the tension-resistant band. The band expediently comprises tension-resistant fibers which are embedded in a thermoplastic matrix and make it possible for the band to be welded on at points intended for this purpose of the bases and/or of the container. The band may be provided as a continuous band or as a band loop; alternatively, plates provided at the ends of the supporting strut or the supporting struts and comprising a number of bands may be braced against one another, the bands being connected at each end to the bases or plates. In the case of bands which are connected at each end to the bases or plates, the attachment may take place by means of hooks and eyes or toggles, eyes provided on the bases or plates for example being able by design to fail under a maximum tensile stress. It goes without saying that the bands may also be welded at each end to the bases.

In the case of an advantageous and expedient variant of the container, the bases are respectively provided at their ends that are remote from the supporting strut with a guiding groove in which a continuously circulating band is placed.

Spring elements may be respectively provided in the bases, for example in the form of integrally formed-on spring tongues over which the band can be laid in a prestressed state, or which introduce a prestress into the band.

In the case of a further preferred variant of the container according to the invention, it is provided that at least one supporting strut extends between a closure cover of the container and a foot element, which is attached on the container wall opposite the closure cover, and that the closure cover and the foot element are connected to one another by means of at least one tension-resistant band. For the purposes of the invention, the band should also be understood as meaning a tension element with a round or angular cross section. Such a configuration on the one hand has the advantage that the support is intended to have a further function, that is to say for example as a feed module or surge tank, for example in the case where the container is formed as a fuel tank or urea tank for a motor vehicle. On the other hand, such a configuration has the advantage that the support can be mounted in the body of the container relatively easily after completion thereof.

As already mentioned above, the foot element may be formed as a surge tank, feed module or the like.

Also in the case of such a configuration of the support and of the container, the band is expediently prestressed at least directly before installing the support in the container.

As already mentioned above, according to the invention the container may be formed as a fuel tank of thermoplastic material, obtained for example by extrusion blow molding of a multilayered extrudate on the basis of HDPE as thermoplastic material. The container may for example have been obtained by extruding and molding a number of preforms in strip form of thermoplastic material in a multipart blow mold, it being possible for example for the bases of the support to be welded to the inner wall of the container during a first molding of container half shells. For this purpose, it is necessary to apply pressure to press the bases against the still warm-plastic inner container wall of the shell-shaped semifinished articles produced in the process. The structure is expediently designed such that these mounting forces can still just about be absorbed by the supporting strut.

The band or bands may extend between the bases in a straight line, but may also be arranged so as to cross one another one or more times. Instead of individual bands or one or more band loops (continuous), a hose or tube of a tension-resistant woven fabric that is made to extend between the bases may for example also be provided.

Instead of a supporting strut in the form of a tube or rod, a truss-like support of a brittle-hard material, for example of glass-fiber-reinforced plastic, may also be provided. Alternatively, a tube or rod of aluminum or thin-walled thermoplastic material may be provided.

Polyoxymethylene or some other brittle material comes into consideration in particular as the plastic. Finally, according to the invention a supporting strut may be of a multipart form, for example it may consist of a number of tubes that allow themselves to be telescoped into one another, which are for example engaged with one another and can be pushed one into the other when a certain compressive force on the support is exceeded.

The problem addressed by the invention is also solved by a support for a container of thermoplastic material which in the installed position extends between two opposing walls of the container and can be anchored at each end to the walls of the container with a positive engagement and/or a material bond, the support extending between two bases and the bases being held on the supporting strut by at least one tension-resistant bracing element.

With preference, according to the invention the support comprises N supporting struts, which extend between N+1 bases, the supporting struts respectively enclosing between them an angle of less than 90°. This produces an arrangement of supports, struts and bands in the manner of a truss structure, the bracing elements absorbing a tensile force induced by positive pressure of the container and the supporting struts absorbing a supporting load on the container walls induced by negative pressure in the container.

For the purposes of the invention, N supporting struts means any desired number of supporting struts that is greater than 1. According to the invention, N+1 bases means that for example two supporting struts respectively comprise three bases. N is preferably an even number, so that for example four supporting struts extend between 5 bases.

Such an arrangement is particularly preferred if the angle between at least two supporting struts is variable, so that the distance of the bases of the supports from one another can be adapted according to the installation situation.

The invention is explained below on the basis of an exemplary embodiment that is represented in the drawings, in which.

Figure 2:
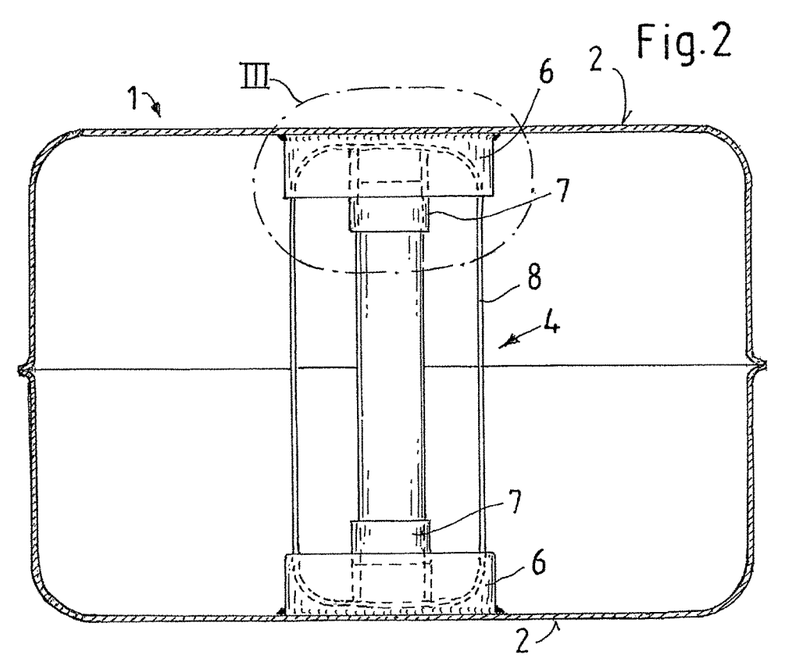
FIG. 2 shows a section through the container according to the invention with the support installed therein.

In FIG. 2, a container 1 as provided by the present invention is represented in section in a greatly simplified form. The container 1 may be formed for example as an integrally formed, extrusion blow-molded fuel tank. This comprises a container wall 2, which encloses a cavity 3 to be filled with liquid. The container wall 2 consists of thermoplastic material, preferably of a multilayered extrudate based on polyethylene.

The opposing regions of large area of the container wall 2, with a relatively small geometrical moment of inertia, are supported against one another by means of a multipart support 4. The support 4 is represented in a perspective view in FIG. 1.

Figure 1:
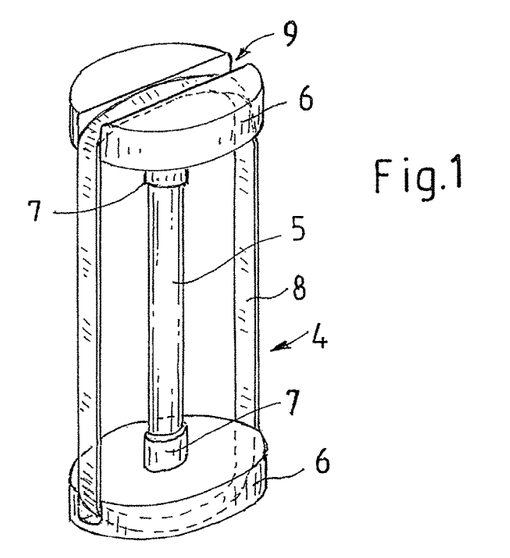
FIG. 1 shows a perspective schematic view of a support according to the invention.

The support 4 comprises a supporting strut 5, which is provided at each end with a base 6 of thermoplastic material, the plastic of the bases 6 being compatible with the plastic of the container wall 2 in terms of weldability.

The bases 6 are fitted at each end onto the supporting strut 5 and are engaged therewith or clipped thereto. The supporting strut 5 is formed as a supporting tube, which likewise consists of thermoplastic material. The supporting strut may for example consist of a fragile plastic or be provided with one or more predetermined breaking points.

The bases 6 are respectively provided on the side facing one another in the installed position with an insertion receptacle 7, into which the supporting strut is fitted or inserted, as can also be seen from FIG. 2.

A fiber-reinforced tension-resistant band, which as a band loop (i.e. continuous) reaches around the bases 6, is denoted by 8. The tension-resistant band 8 is respectively placed in a groove 9 of the bases 6, the bottom of the groove 10 respectively forming two radii 11, which make it possible for the tension-resistant band 8 to be laid without any kinks. This can be seen in particular from the sectional view in FIG. 3.

In the fitted-together configuration in FIG. 1, the support 4 is mounted such that the tension-resistant band 8 reaches around the bases 6 under prestress.

Figure 3:
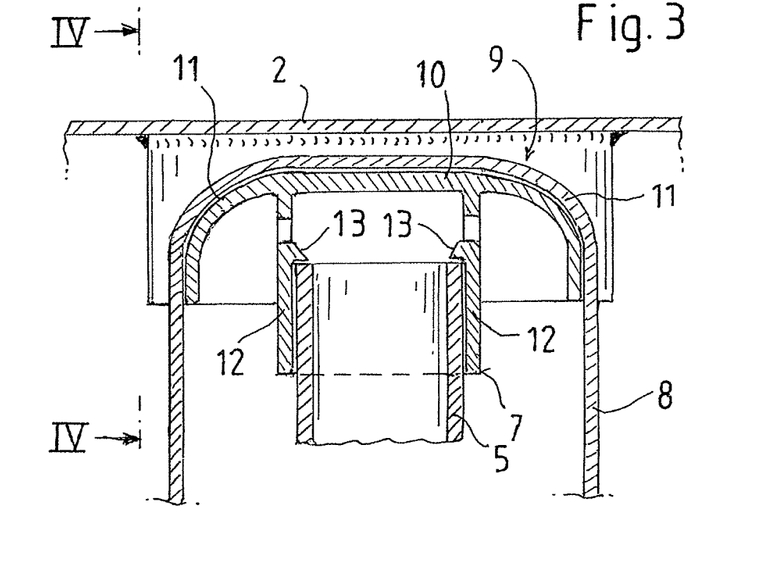
FIG. 3 shows an enlarged detailed view of the detail III in FIG. 2.
Figure 4:
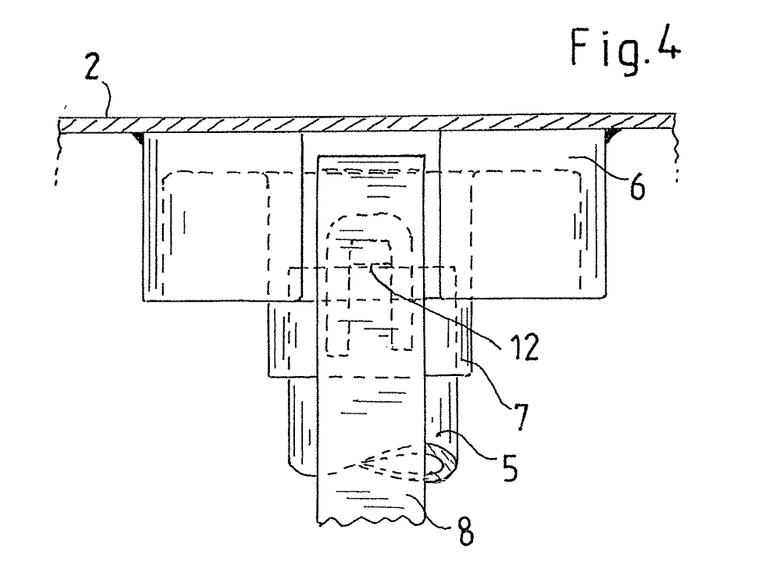
FIG. 4 shows a view along the line IV in FIG. 3.

As can be seen from the representations from FIGS. 3 and 4, the insertion receptacle 7 of the bases 6 is respectively provided with two diametrically opposite detent springs 12, which in the final installed position of the supporting strut 5 within the base 6 axially form a stop for the supporting strut 5.

This mechanism serves both for the purpose of fixing the supporting strut 5 and the bases 6 with respect to one another and as a mounting aid. During the mounting, first the supporting strut 5 is pushed completely into the insertion receptacle 7, the detent springs 12 being pressed apart. Driving apart of the detent springs 12 may be accomplished for example by a corresponding tool. Then, the tension-resistant band 8 is placed around the bases. Withdrawal of the supporting strut 5 from the insertion receptacle 7 brings about a stressing of the tension-resistant band 8. The position of the detent springs 12 and of the detent projections 13 provided on them and also the length of the band are dimensioned such that the detent projections 13 grip behind the end face of the supporting strut 5 when a predetermined stress of the tension-resistant band 8 is reached. In this state, the supporting strut 5 and at least one base 6 and the tension-resistant band 8 looped around the bases are held in an arrested and prestressed position. For this purpose it is merely necessary that one of the bases 6 is correspondingly formed. In this prestressed and mounted position, the support 4 can be attached in the interior of the container 1, the bases 6 being welded to the container wall 2 in the case of a preferred variant of the container 1.

The mounting of the support 4 may take place for example during the molding of the container 1 by extrusion blow molding on the container 1.

Figure 5:
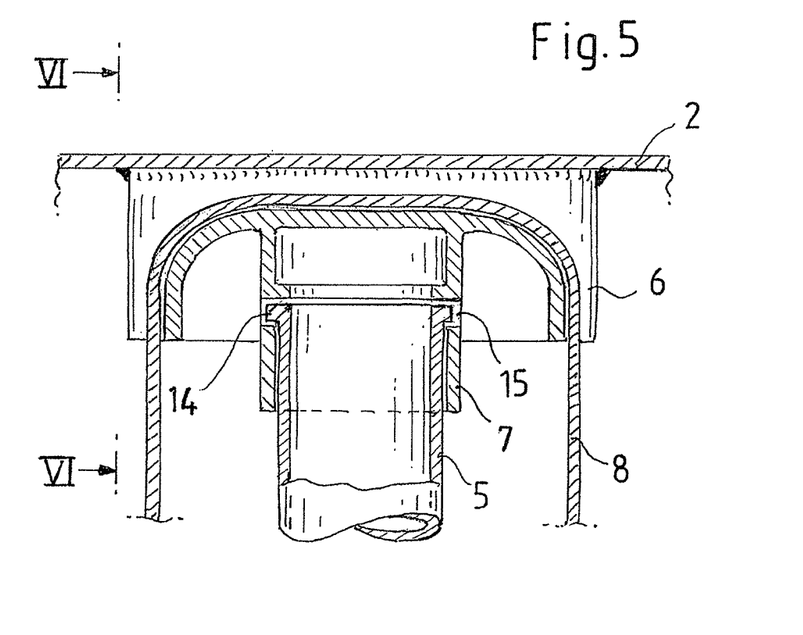
FIG. 5 shows an alternative configuration of the base of the support according to the invention.
Figure 6:
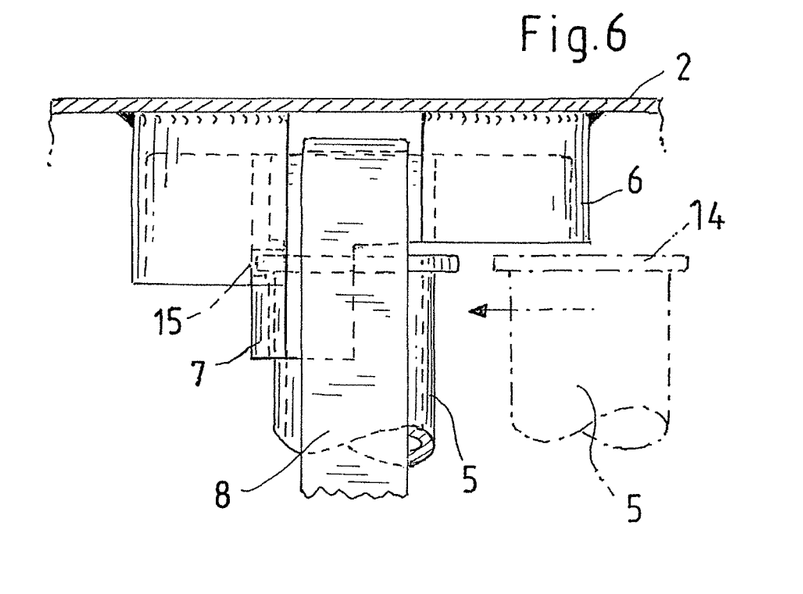
FIG. 6 shows a view along the line VI in FIG. 5.

An alternative variant of the attachment of the supporting strut 5 to the base 6 is represented for example in FIGS. 5 and 6. In the case of this configuration of the supporting strut 5, this strut is provided at each end, or at least one end, with a protruding collar 14 which runs around the outside and in the installed position of the supporting strut 5 is received by a correspondingly formed complementary groove 15 of the insertion receptacle 7. For this purpose, the insertion receptacle 7 is broken through or open over part of its periphery, so that, as indicated in FIG. 6, a lateral clipping-in or pushing-in of the supporting strut 5 into the base 6 is possible.

As mentioned at the beginning, the supporting strut 5 is preferably formed as a cylindrical supporting tube; the insertion receptacle 7 has a cross section complementing this.

It may be provided within the scope of the invention that the supporting strut may also have different cross-sectional geometries; the insertion receptacle 7 is then formed correspondingly to complement the cross section of the supporting strut 5.

The connection between the supporting strut 5 on the one hand and the base 6 on the other hand does not necessarily have to be realized by means of an insertion receptacle for the supporting strut 5; rather, other positively engaging connections are also possible; not least, a screw connection between the base 6 and the supporting strut 5 is also possible and conceivable. In particular when threaded connections are used, the length of the supporting strut 5 can be varied such that the tension-resistant band 8 can be drawn relatively easily to the desired prestress.

Figure 7:
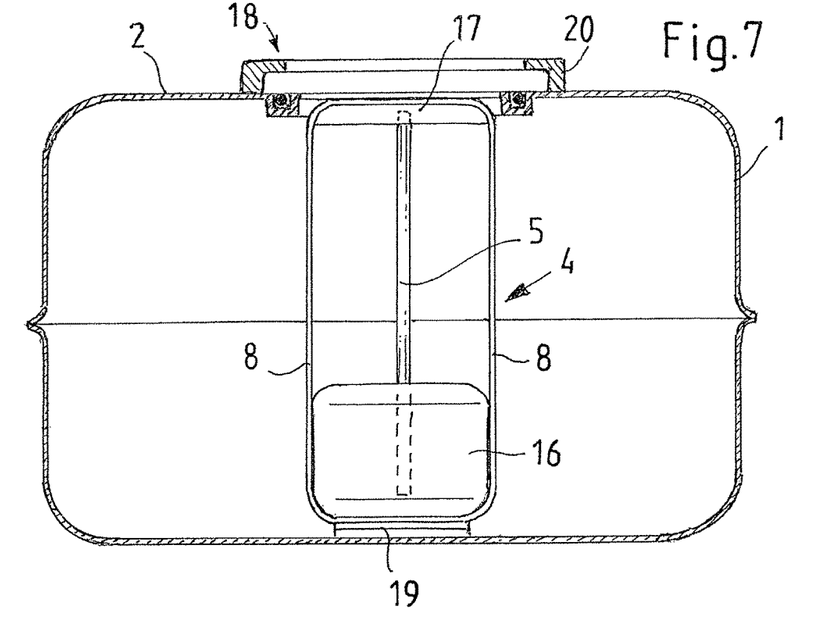
FIG. 7 shows a section through a container according to a further embodiment of the invention, in which the support comprises a surge tank and a closure cover.

A further configuration of the container according to the invention is represented for example in FIG. 7.

The support 4 comprises a supporting strut 5 as a supporting rod or supporting tube and also a foot element in the form of a surge tank 16 and a closure cover 7. The supporting strut 5 extends between the closure cover 17 and the surge tank 16, which are braced against the supporting strut 5 by means of the continuous tension-resistant band 8. The surge tank 16 may for example be part of a feed unit that is not represented, for example be formed with a fuel feed pump and a filling-level indicator. The entire arrangement comprising the closure cover 17, the surge tank 16 and the supporting strut 5 is fitted into the container 1 through an inspection opening 18 in the container 1. The closure cover 17 and the surge tank 16 assume the function of the bases 6 mentioned in the previously described exemplary embodiment, the functions of the closure of the container and the reception of a fuel feed pump being realized simultaneously by the support 4.

Once the support 4 has been fitted into the inspection opening 18 of the container 1, it is possible for example for the surge tank 16 to be attached by a foot 19 provided thereon to the container wall 2, either by engaging, welding or adhesive bonding. In this position, the closure cover 17 covers the inspection opening 18 such that it can be secured on the container 1, for example by a union closure 20. The tension-resistant band 8 reaches around the surge tank 16 and the closure cover 17 or parts of the closure cover 17 that protrude into the cavity 3 of the container 1.

The arrangement comprising the supporting strut, the surge tank and the closure cover is preferably fitted into the inspection opening 18 of the container in a completely prestressed form such that it can be secured in the container 1 in this state.

Figure 8:
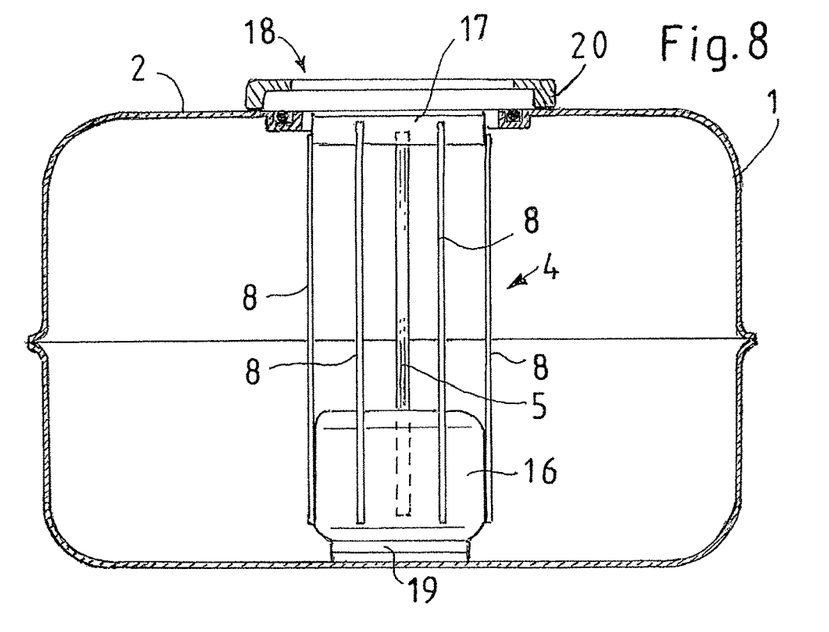
FIG. 8 shows a modified embodiment of the exemplary embodiment according to FIG. 7.

A further alternative configuration of the container 1 according to the invention is represented in FIG. 8.

Instead of a continuously circulating band 8, as represented in FIG. 7, a number of bands 8 are provided there, attached at each end to a collar of the closure cover 17 and to the surge tank 16. The bands 8 may for example be welded to the closure cover 17 and also to the surge tank 16.

Figure 9:
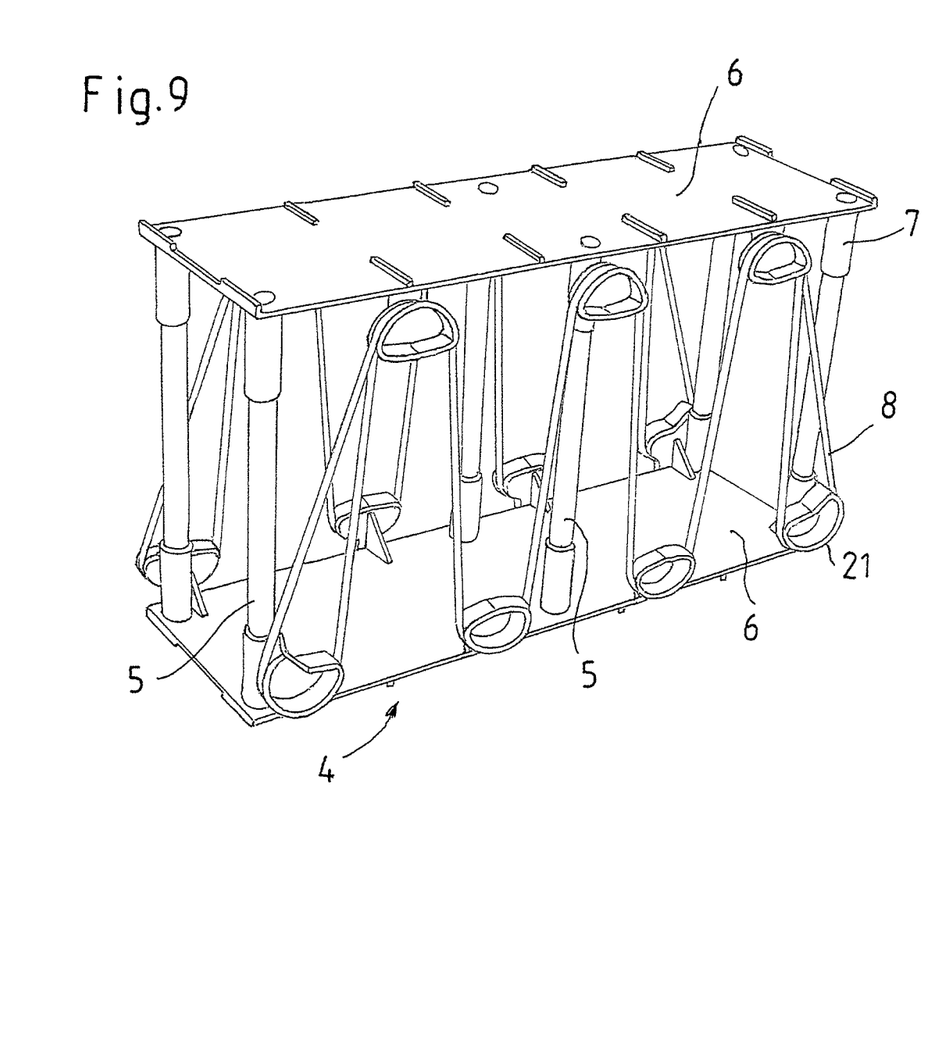
FIG. 9 shows a representation of a further embodiment of the support according to the invention.

Reference is now made to the exemplary embodiment of the support 4 that is represented in FIG. 9. This support 4 comprises a multiplicity of supporting struts and two bases 6, which are respectively supported against one another by means of a number of supporting struts 5. The supporting struts 5 are held by insertion receptacles 7 formed integrally with the bases 6. Otherwise, the composition of the supporting struts 5 corresponds to the supporting struts according to the previous exemplary embodiments.

Additionally provided respectively on the bases 6 are a number of holding elements in the form of holding brackets 21, over which the tension-resistant band 8 is laced. The bases 6 have a respectively rectangular outline, on the longitudinal sides of which a number of holding brackets 21 are respectively provided. In the case of the support represented in FIG. 9, an even number of holding brackets are respectively provided on the longitudinal sides of the base 6 that is the lower base in the installed position; an uneven number of holding brackets are respectively provided on the longitudinal sides of the base 6 that is shown at the top in FIG. 9. The holding brackets 21 of the lower base are respectively arranged offset in relation to the holding brackets 21 of the upper base 6, so that on each side of the support 4 the tension-resistant band 8 can be laid in a zigzag form in the manner of a shoelace.

Altogether, the support 4 comprises two tension-resistant bands 8, which respectively extend on one side of the support 4, the tension-resistant band 8 at each end forming a loop and respectively looping around the foremost and rearmost holding bracket 21 to form the loop.

Figure 10:
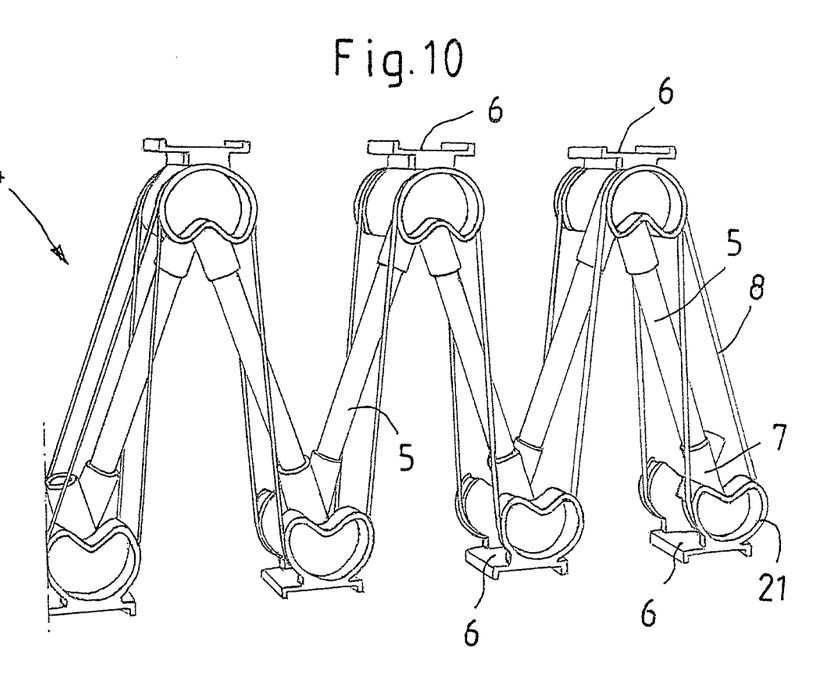
FIG. 10 shows a schematic view of a further exemplary embodiment of a support according to the invention and FIG. 11 shows a longitudinal section through a base from the representation according to FIG. 10.

Another variant of the support 4 is represented in FIG. 10. This support 4 comprises a number of supporting struts 5 extending at an angle in relation to one another, this angle being less than 90°, at least in the installed position of the support 4. In the variant of the support 4 represented in FIG. 10, the supporting struts 5 enclose between them an acute angle. Instead of a single base 6 on each side of the supporting struts 5, a multiplicity of bases 6 are provided, two supporting struts 5 that extend at an angle in relation to one another respectively extending between an upper base 6 and two lower bases 6. In the bases 6, the insertion receptacles 7 are respectively arranged so as to be pivotably movable in relation to one another, so that the distance between the upper bases 6 and the lower bases 6 is adjustable as a result of the variability of the angles between the supporting struts 5. In this way it is possible to introduce the support 4 into an already completed plastic container and brace it between the container walls by corresponding positioning or setting of the angles. The support 4 is adaptable to different container geometries.

Figure 11:
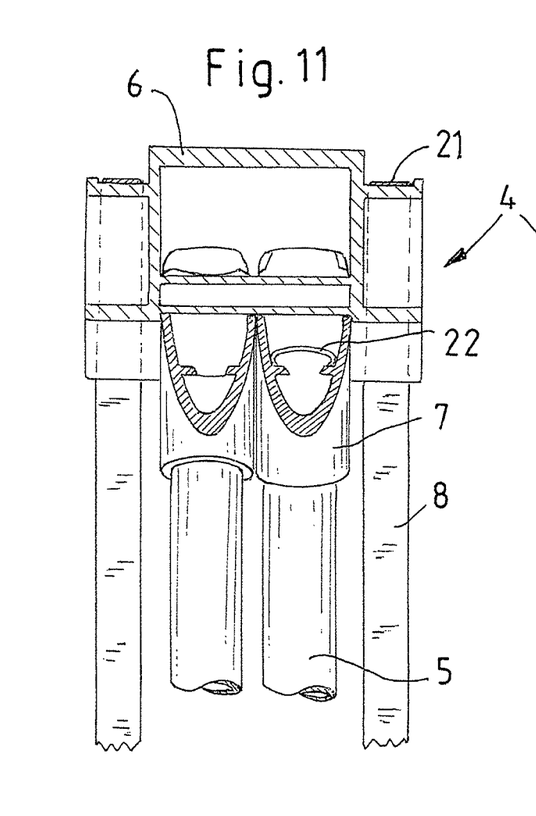

The support according to FIGS. 10 and 11 is otherwise formed in a way corresponding to the supports according to the other exemplary embodiments.

As can be seen from the sectional view in FIG. 11, the supporting struts 5 are supported at each end against a web 22 that runs around in the insertion receptacles 7 and is dimensioned so as to fail when a predetermined compressive force on the supporting strut 5 is exceeded, so that the supporting strut 5 can slip through with respect to the insertion receptacle 7.

LIST OF DESIGNATIONS 1 container
2 container wall
3 cavity
4 support
5 supporting strut
6 base
7 insertion receptacles
8 tension-resistant band
9 groove
10 bottom of groove
11 radii
12 detent springs
13 detent projections
14 collar
15 groove
16 surge tank
17 closure cover
18 inspection opening
19 foot
20 union closure
21 holding bracket
22 web

The invention claimed is:
1. A container comprising:
the container formed of thermoplastic material, at least one support arranged in an interior of the container extending between two opposing walls of the container, wherein the at least one support has opposite ends, and is anchored at each end of the opposite ends to one of the two opposing walls of the container with at least one of a positive engagement and a material bond, wherein the at least one support includes at least one supporting strut, wherein the supporting strut substantially absorbs only a supporting load on the container walls induced by negative pressure in the container, and a tensile force on the container walls induced by positive pressure in the container is absorbed by at least one tension-resistant bracing element which extends between the container walls, wherein the supporting strut has opposite ends and is provided at each end of the opposite ends with a base which is connected to the container wall, wherein the supporting strut is engaged compliantly in a longitudinal direction in at least one of the bases.

2. The container as claimed in claim 1, wherein the supporting strut is formed as a supporting rod or supporting tube.

3. The container as claimed in claim 1, wherein the at least one support is anchored at each of the opposite ends to one of the two opposing walls of the container, respectively, without extending through either of the opposing walls of the container.

4. The container as claimed in claim 1, wherein each of the bases are connected to one another by the at least one tension-resistant bracing element.

5. The container as claimed in claim 1, wherein the bases are prestressed against the supporting strut by the at least one tension-resistant bracing element.

6. The container as claimed in claim 1, wherein the at least one tension-resistant bracing element comprises at least one band of fiber-reinforced plastic or of glass fiber, aramid fiber or carbon fiber.

7. The container as claimed in claim 1, wherein the at least one tension-resistant bracing element is formed as a continuous band.

8. The container as claimed in claim 1, wherein the at least one tension-resistant bracing element comprises a plurality of tension-resistant bands, respectively connecting oppositely arranged bases to one another.

9. The container as claimed in claim 1, wherein the supporting strut extends between a closure cover of the container and a foot element, which is attached on the container wall opposite the closure cover, and in that the closure cover and the foot element are connected to one another by at least one tension-resistant bracing element.

10. The container as claimed in claim 9, wherein the foot element is formed as at least one of a surge tank and a feed module.

11. The container as claimed in claim 1, wherein the tension-resistant bracing element is prestressed.

12. A support for a container of thermoplastic material which in the installed position extends between two opposing walls of the container and is anchorable at opposite ends to the walls of the container with at least one of a positive engagement and a material bond, the support comprising at least one supporting strut, the supporting strut having a longitudinal axis and extending between two bases and the bases being braced against the supporting strut by at least one tension-resistant bracing element, and wherein the supporting strut is engaged compliantly in a longitudinal direction in at least one of the bases, and wherein the at least one tension-resistant bracing element extends along the longitudinal axis of the supporting strut.

13. The support as claimed in claim 12, wherein the at least one supporting strut further comprises a plurality of supporting struts and each of the supporting struts of the plurality of supporting struts extend between a plurality of bases such that the plurality of supporting struts respectively enclose between them an angle of less than 90°.

14. The support as claimed in claim 13, wherein the at least one supporting strut further comprises at least two supporting struts and an angle between the at least two supporting struts is variable.

15. A container comprising:
the container formed of thermoplastic material,
at least one support arranged in an interior of the container extending between two opposing walls of the container,
wherein the at least one support includes at least one compression-resistant supporting strut, and at least one tension-resistant bracing element,
wherein the compression-resistant supporting strut has a longitudinal axis and opposite ends, wherein at each end of the opposite ends of the compression-resistant supporting strut is a base which is connected to one of the two opposing walls of the container with at least one of a positive engagement and a material bond,
wherein the compression-resistant supporting strut is movable along the longitudinal axis in at least one of the bases,
wherein the compression-resistant supporting strut is configured to absorb compressive force from the container walls induced by a negative pressure in the container, and
wherein the tension-resistant bracing element extends along the longitudinal axis of the supporting strut, and is configured to absorb tensile force from the container walls induced by a positive pressure in the container.

16. The container as claimed in claim 15, wherein the compression-resistant supporting strut is configured not to absorb the tensile force from the container walls induced by the positive pressure in the container.

17. The container as claimed in claim 15, wherein the tension-resistant bracing element is configured not to absorb the compressive force from the container walls induced by the negative pressure in the container.

18. The container as claimed in claim 15, wherein the support has a tensile strength and a compressive strength, and wherein the tensile strength is greater than the compressive strength.

* * * * *